US008326830B2

(12) United States Patent
Hollingsworth

(10) Patent No.: US 8,326,830 B2
(45) Date of Patent: Dec. 4, 2012

(54) PATTERN RECOGNITION IN WEB SEARCH ENGINE RESULT PAGES

(75) Inventor: Daniel Hollingsworth, Cincinnati, OH (US)

(73) Assignee: Business Objects Software Limited, Dublin (IE)

( * ) Notice: Subject to any disclaimer, the term of this patent is extended or adjusted under 35 U.S.C. 154(b) by 253 days.

(21) Appl. No.: 12/573,894

(22) Filed: Oct. 6, 2009

(65) Prior Publication Data

US 2011/0082884 A1 Apr. 7, 2011

(51) Int. Cl.
*G06F 17/30* (2006.01)
(52) U.S. Cl. ......... 707/730; 707/709; 707/728; 707/750
(58) Field of Classification Search ............. 707/1, 100, 707/104, 3, 705, 713, 771, 776, 758, 750, 707/748, 709, 728, 730
See application file for complete search history.

(56) References Cited

U.S. PATENT DOCUMENTS

| 6,721,736 | B1 | 4/2004 | Krug et al. | |
|---|---|---|---|---|
| 7,203,382 | B2* | 4/2007 | Mattausch et al. | 382/305 |
| 7,415,460 | B1* | 8/2008 | Phillips et al. | 707/999.003 |
| 7,734,614 | B2* | 6/2010 | Aoki et al. | 707/711 |
| 7,788,269 | B2* | 8/2010 | Behnen et al. | 707/754 |
| 7,945,552 | B2* | 5/2011 | Takuma et al. | 707/706 |
| 2006/0080292 | A1* | 4/2006 | Alanzi | 707/3 |
| 2006/0200462 | A1 | 9/2006 | Kadayam et al. | |
| 2007/0276812 | A1* | 11/2007 | Rosen | 707/3 |
| 2008/0097891 | A1* | 4/2008 | Park | 705/37 |
| 2008/0263022 | A1* | 10/2008 | Kostorizos et al. | 707/5 |
| 2009/0150792 | A1* | 6/2009 | Laakso et al. | 715/738 |

OTHER PUBLICATIONS

European Patent Office; Extended European Search Report dated Nov. 10, 2010; EPO, Berlin, Germany.
Jiying Wang and Fred H. Lochovsky; Data Extraction and Label Assignment for Web Databases; Proceeding WWW '03 Proceedings of the 12th international conference on World Wide Web; 2003; ACM, New York, USA; (http://portal.acm.org/citation.cfm?id=775179).
James Pitkow and Peter Pirolli; Mining Longest Repeating Subsequences to Predict World Wide Web Surfing; Proceedings of USITS' 99: The 2nd USENIX Symposium on Internet Technologies & Systems; Oct. 11-14, 1999; The USENIX Association; Boulder, Colorado, USA; (http://citeseerx.ist.psu.edu/viewdoc/download?doi=10.1.1.46.5428&rep=rep1&type=pdf).
Chang, Chia-Hui and Hsu, Chun-Nan; Automatic Extraction of Information Blocks Using PAT Trees; 1999; Dept. of Computer Science and Information Engineering, National Central University, Taipei, Taiwan; (http://www.csie.ncu.edu.tw/~chia/pub/autoextract.pdf).
Damian Eads and Philip Zigoris; Automated Itemiziation for Federated Search; May 8, 2006; Jack Baskin School of Engineering; Santa Cruz, CA, USA; (http://users.soe.ucsc.edu/~eads/itemizer/pp.pdf).
Damian Eads; Major Software, Prototype Software, Unreleased Software; 2006; Jack Baskin School of Engineering; Santa Cruz, CA, USA; (http://users.soe.ucsc.edu/~eads/software.shtml).

(Continued)

*Primary Examiner* — Dangelino Gortayo

(57) ABSTRACT

Described herein are methods and systems for pattern recognition in web search engine result pages. The input data is a result page from a web search engine as well as an integer number for the results on the page. The output is a regular expression that matches all the results on the page, capturing each result and its individual fields.

11 Claims, 4 Drawing Sheets

OTHER PUBLICATIONS

Reis. D.C , P.B. Golgher, A.S. Silva and A.F. Laender; Automatic web news extraction using tree edit distance; Proceedings of the 13th international conference on World Wide Web; 2004; ACM; New York, USA; (http://www.uzh.ch/home/mazzo/reports/www2004conf/papers/1p502.pdf).

Hongkun Zhao, Weiyi Meng, Clement Yu; Automatic extraction of dynamic record sections from search engine result pages; Proceedings of the 32nd international conference on Very large data bases; 2006; VLDB Endowment; Seoul, Korea; (http://www.vldb.org/conf/2006/p989-zhao.pdf).

Z. Wu, V. Raghavan, Weiyi Meng, Hai He, Clement Yu; Towards Automatic Incorporation of Search Engines into a Large-Scale Metasearch Engine; Proceedings of IEEE/WIC International Conference on Web Intelligence; 2003; IEEE Computer Society; Washington, DC, USA; (http://citeseerx.ist.psu.edu/viewdoc/download?doi=10.1.1.91.662&rep=rep1&type=pdf ).

Weiyi Meng, Clement Yu, King-Lup Liu; Building efficient and effective metasearch engines; ACM Computing Surveys; 2002; ACM; New York, USA; (http://www.cs.binghamton.edu/~meng/pub.d/meng-survey.pdf).

Luis Gravano, Chen-Chuan K. Chang, Hector Garcia-Molina; Starts: Stanford Proposal for Internet Meta-Searching; ACM International Conference on Management of Data; 1997; ACM; New York, USA; (http://ilpubs.stanford.edu:8090/271/1/1997-57.pdf).

Luis Gravano, Kevin Chang, Hector Garcia-Molina, Andreas Paepcke; Starts Stanford Protocol Proposal for Internet Retrieval and Search; 1997; Stanford University, Stanford, CA, USA; (http://ilpubs.stanford.edu:8090/283/1/1997-68.pdf).

Zonghuan Wu, D. Mundluru and Vijay V. Raghavan; Automatically Detecting Boolean Operations Supported by Search Engines, towards Search Engine Query Language Discovery; Workshop on Web-based Support Systems; 2004; University of Louisiana; Lafayette, USA; (http://www.cacs.louisiana.edu/~zwu/publications/boolean.pdf).

Tetsuya Nakatoh , Yasuhiro Yamada, Sachio Hirokawa; Automatic Generation of Deep Web Wrappers based on Discovery of Repetition; Proceedings of the First Asia Information Retrieval Symposium; 2004; Kyushu University; Fukuoka, Japan; (http://citeseerx.ist.psu.edu/viewdoc/download?doi=10.1.1.96.2301&rep=rep1&type=pdf).

Douglas Boulware, John Salerno, Nina Zumel and Michael Manno; Buddy: Harnessing the power of the internet; 2008; Wiley Periodicals, Inc.; Burlington, Massachusetts, United States of America; (http://www.mzlabs.com/NinaZumel/publications/BuddyJournal.pdf).

Kate T Noerr; Muse Metasearch: Beyond Federated Searching; Sep. 2006; Elsevier Inc.; Burlington, Massachusetts, United States of America; (http://www.sciencedirect.com/science?_ob=ArticleURL&_udi=B6W63-4KGX888-5&_user=10&_coverDate=09%2F30%2F2006&_rdoc=1&_fmt=high&_orig=search&_sort=d&_docanchor=&view=c&_searchStrld=1348378805&_rerunOrigin=google&_acct=C000050221&_version=1&_urlVersion=0&_userid=10&md5=9c92bfc18addf7cc6b47632100f2228d).

Museglobal; The Connector Ecosystem; 2008; Museglobal, Inc.; San Francisco, CA, USA; (http://www.infonortics.com/searchengines/sh09/slides/noerr-2.pdf).

* cited by examiner

PATTERN RECOGNITION IN WEB SEARCH ENGINE RESULT PAGES

FIELD OF THE INVENTION

The invention relates to a pattern recognition algorithm. More precisely, the invention relates to pattern recognition in web search engine result pages.

BACKGROUND OF THE INVENTION

A search engine is an information retrieval system designed to help find information from one or more sources. A web search engine typically retrieves information from an open data source such as the World Wide Web but search engines can be targeted at any number of data sources, including other search engines. Search engines that search multiple sources and aggregate the results are often called "federated search engines" and sometimes "meta search engines". When a federated search engine queries another search engine, often the only way to retrieve the results is via the same result page the target search engine displays to users. The federated search engine must then extract each result and its fields from the result page before the results can be aggregated. Effectively extracting this data is a common problem for federated search engines. There are different tools for dissociating the information of interest from the entire data that is retrieved. One technique for accomplishing such dissociation is by means of regular expressions. Regular expressions consist of meta-text written in a formal language that other programs can use to match text patterns and extract values occurring within the match. Regular expressions are the key to powerful flexible and efficient text processing.

SUMMARY OF THE INVENTION

A computerized method and system for pattern recognition in web search engine result pages are described herein. In one embodiment, the method includes receiving a result page from a web search engine and an integer number for the results on the result page. The result page is simplified by making variations through excluding noisy markup tags and each pattern from the variations is tested to see if it repeats the integer number times. The method also includes defining one or more result patterns and evaluating the highest rated according to predefined criteria. The method ends with generating a regular expression from the highest rated result pattern.

In another embodiment of the invention, the system includes one or more memory devices with a search application to search a variety of sources and a processor to execute the instructions in the memory related to the search application. The system also includes a search server to process all the encountered search results of the search application and a broker plug-in for the search server, to translate the search queries, perform the search, page through the result, pull out results from the pages, and extract fields from each result.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for pattern recognition in web search engine result pages are described herein. In the following description, numerous specific details are set forth to provide a thorough understanding of embodiments of the invention. One skilled in the relevant art will recognize however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
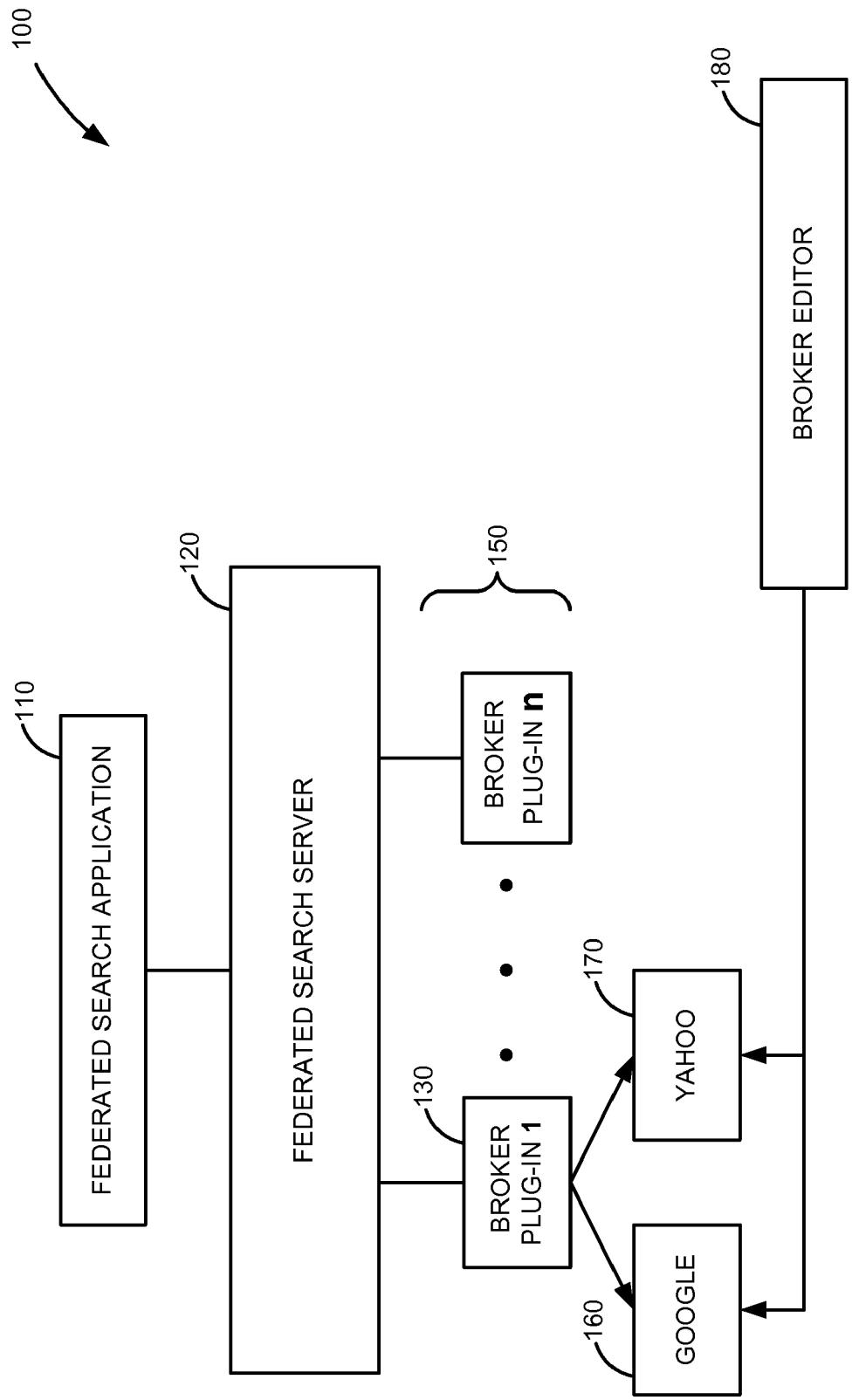
FIG. 1 is a block diagram of system architecture for performing federated searches.

FIG. 1 represents system architecture 100 for performing federated searches. The Federated Search Application 110 lets users search in a variety of sources from a single interface. It also performs text analysis such as entity extraction and categorization on the results and the content it gets. A Federated Search Server 120 processes the encountered search results from different sources. The Federated Search Server 120 gets the results through brokers 150, which serve as mediators to various types of sources. According to one embodiment, the brokers 150 may be implemented as plug-ins to the Federated Search Server 120. The brokers 150 may be configured specifically to get results from their respective sources, for example the Google™ search engine 160 from Google corporation of Mountain View, Calif. or Yahoo® search engine 170 from Yahoo corporation of Sunnyvale Calif., and let the Federated Search Server 120 get the results in a uniform way. The brokers 150 translate the search queries, perform the search, page through the result, extract results from the pages, extract fields from each result and cleanup fields. Each broker can be configured for specific sources. For example, the broker 130 may be configured through the Broker Editor 180 for each web search engine, such as Google 160 and Yahoo 170 to include the URL to those sources and also various settings the broker 130 needs to make the HTTP requests and extract the results coming back from the HTTP responses. Thus, by using the Broker Editor 180, configuration files for every search engine may be created. For example, the broker 130 may be suitable for web search engines that do not provide Application Programming Interfaces (APIs) and return results in a Hypertext Markup Language (HTML) format to be displayed in a web browser.

Figure 2:
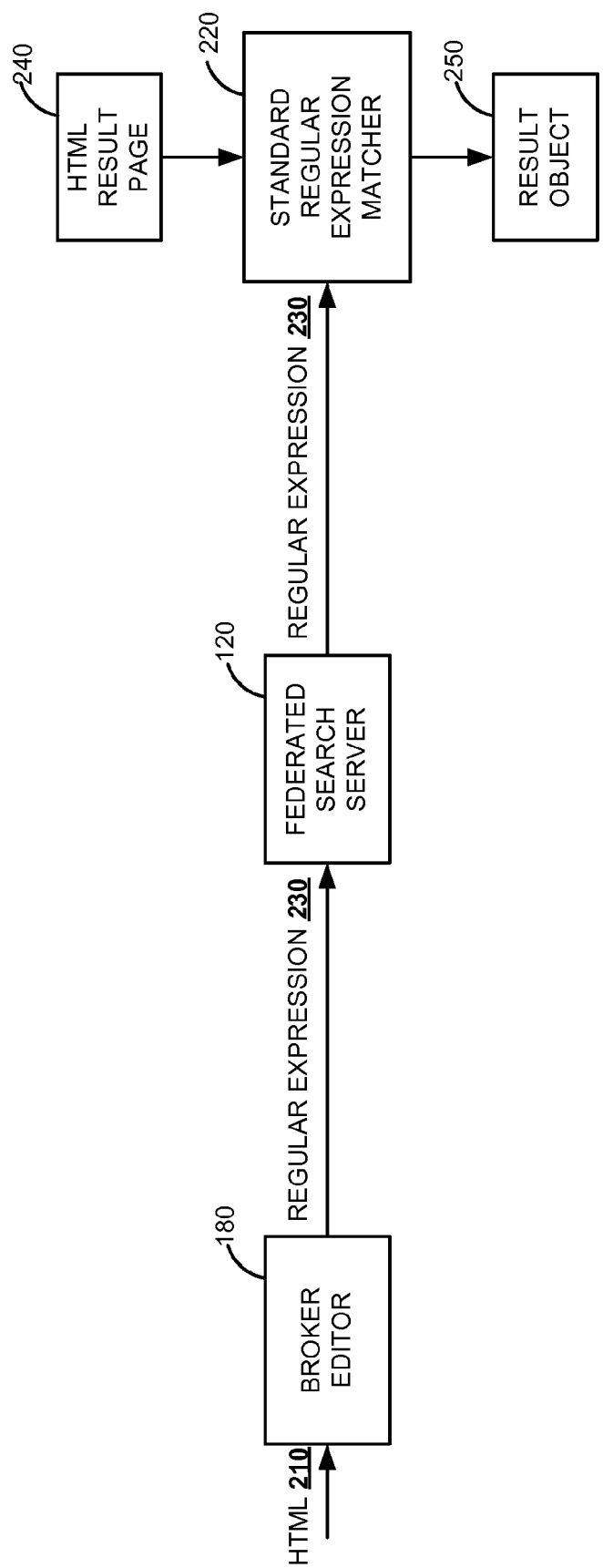
FIG. 2 is a block diagram of an embodiment of the invention for pattern recognition in web search engine result pages.

In one embodiment, as shown in FIG. 2, a federated search server 120 provides a regular expression 230 to a standard regular expression matcher 220. Regular expressions consist of meta-text written in a formal language that other programs can use to match text patterns and extract values occurring within the match. Regular expressions are the key to powerful flexible and efficient text processing. The regular expression 230 is used to match text patterns and extract fields occurring within an HTML result page 240. The regular expression 230 is retrieved by processing a raw HTML 210 that comes from a search engine. The broker editor 180 is used for processing the raw HTML 210 into the regular expression 230. This processing is further explained in connection to FIG. 3. In some embodiments, the standard regular expression matcher 220 may reside within the federated search server 120. The standard regular expression matcher 220 receives two inputs—the regular expression 230 and an HTML result page 240 from the same or similar search engine as the raw HTML 210. By having the regular expression 230, the standard regular expression matcher 220 is able to extract a result object 250 from the HTML result page 240. This result object consists of fields from the HTML result page 240 that may be of interest to a user. Thus, pattern recognition in web search engine result page is performed to extract some fields of the result page that may be of interest to a user.

Figure 3:
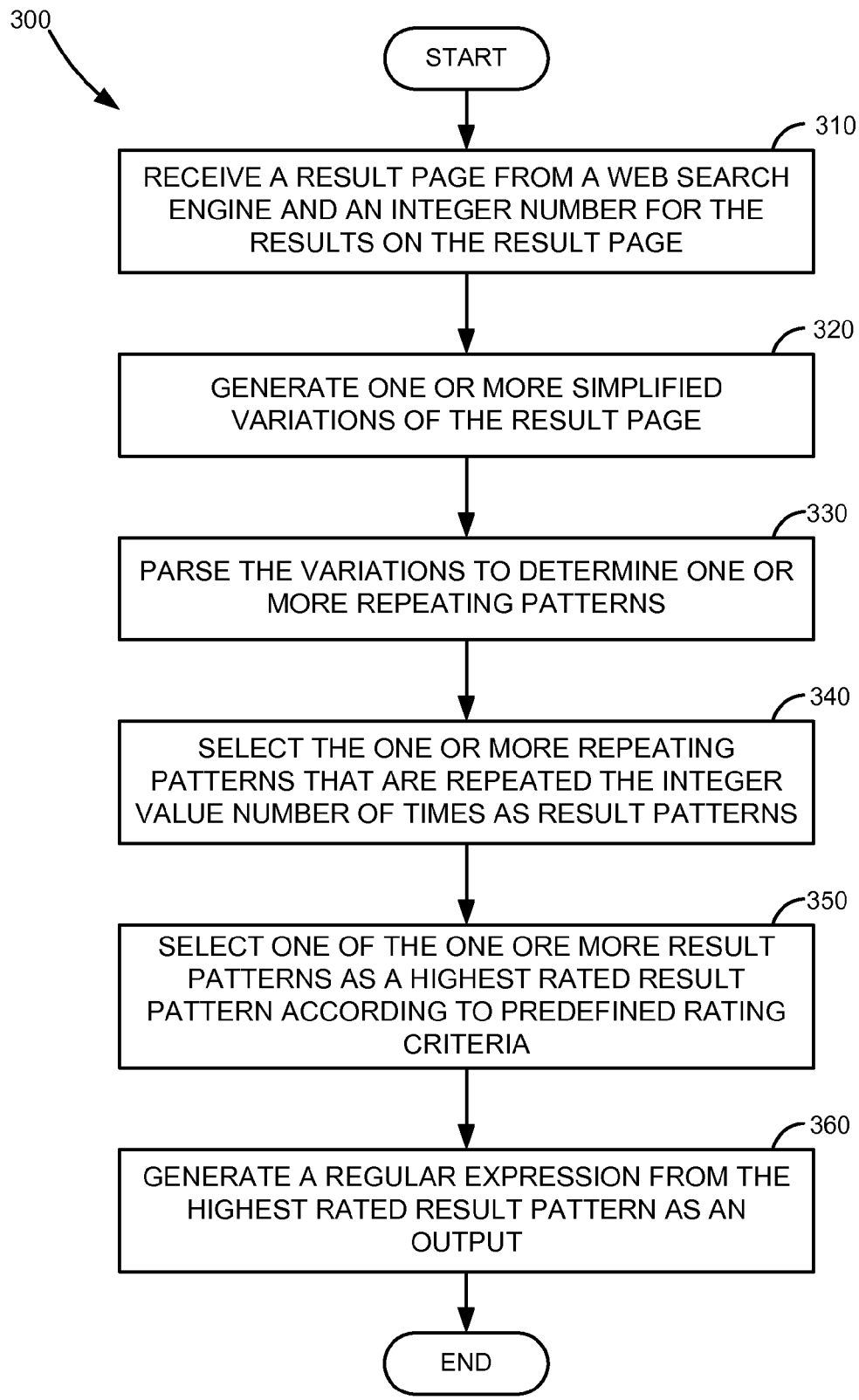
FIG. 3 is a flow diagram describing a pattern recognition method for web search engine result pages according to an embodiment of the present invention.

The way the Broker Editor 180 may transform raw result pages from web search engines into regular expressions is explained in reference to FIG. 3. FIG. 3 is a flow diagram describing a pattern recognition method 300 for web search engine result pages. First, at block 310, a result page, which is a string of text and markup tags, is received as input. An integer number for the results on the result page is also used as an input, which is later necessary in discovering result patterns. The result page typically comes from a web search engine. The result page is typically in HTML, a text-based markup language used to write web pages. HTML tags are coding instructions imbedded in HTML documents. A web browser is designed to read the instructions, or HTML tags, in order to render the page graphically. Thus, a web browser translates HTML tags into visual effects that mold the way an HTML document looks to the viewer. The content between HTML tags is referred to here as a free text element. The raw result page may consist of noisy data some of which may be HTML tags. Then, at block 320, the result page is simplified. Part of the simplification is excluding noisy HTML tags and everything inside the tags is stripped. Examples of noisy HTML tags are bold tags, break tags, cite tags, emphasis tags, font tags, image tags, italic tags, no break tags, span tags, strong tags, and underline tags. Because some HTML noisy tags may be useful, different variations of simplified HTML pages are created that preserve one HTML noisy tag. There might be tags that are stripped in all cases like, for example, break tags and image tags. There might also be a variation, which preserves none of the HTML noisy tags. All removed HTML tags may be restored so there is data saved for the removed HTML tags and their location. An example of HTML simplification is presented below:

Original HTML:
<html>
<body>
<h1 class="c">My Webpage</h1>
<span class="d">Hello and welcome </span>

-continued

<font size=1>to my webpage! </font>
<i>Enjoy </i>
your stay
<p>and visit again</p>.
</body>
</html>
Simplified HTML (simplified variation 1, Span tags preserved):
<html><body><h1>FREETEXT</h1><span>FREETEXT</span>
FREETEXT<p>FREETEXT</p></body></html>
Simplified HTML (simplified variation 2, Font tags preserved):
<html><body><h1>FREETEXT</h1>FREETEXT<font>
FREETEXT</font>FREETEXT<p>FREETEXT</p></body></html>
Simplified HTML (simplified variation 3, I tags preserved):
<html><body><h1>FREETEXT</h1>FREETEXT<i>
FREETEXT</i>FREETEXT<p>FREETEXT</p></body></html>
Simplified HTML (simplified variation 4, No tags preserved):
<html><body><h1>FREETEXT</h1>FREETEXT<p>
FREETEXT</p></body></html>

As seen above, not only certain HTML tags are removed during the simplification. The free text is simplified and everything inside an HTML tag, except for the tag name, is stripped. For example, the attributes on the span tags are removed, such as 'class="d"', as well as extra spaces. There might be cases where multiple free text sections run together when tags are stripped. In such cases these sections are combined into one. The different variations of simplified HTML can help in the proper extraction of result fields, such as in the following example, where some of the search result fields are separated by span tags:

<a href="news.htm">Breaking news stories</a><p/><span> January 1, 2009</span><span>Check out top news stories of the day</span>

Span tags are usually stripped because they often clutter up the page and make repeating patterns of tags hard to find. But sometimes they are an integral part of a pattern. By using alternate simplifications, the HTML may be analyzed with span tags and without. If only the versions that had stripped spans of this HTML were analyzed, then each extracted result would have had the date and summary lumped together.

Turning back to FIG. 3, in the next step, at block 330, the simplified variations are parsed for patterns, iterating over each variation and finding repeating patterns. At block 340, the patterns that repeat the exact number of the integer value that was input in block 310, are selected as result patterns. To check how many times each pattern is repeated, the pattern may be converted to a string and then standard string operations may be performed. A pattern according to some embodiments is a substring of a simplified result page. The substring begins on an open angle bracket ("<") or the free text marker and ends on a close angle bracket (">") or the free text marker. For example, "<h1>FREETEXT</h1>FREETEXT" could be a pattern. If a pattern is found to be repeated within the HTML code a number of times equal to the integer number submitted as input above in step 310 then it is suspected as a result pattern. Each match found from such a result pattern and its underlying raw HTML are evaluated to locate some fields that are of interest to the search. Such fields of interest may be, for example, URL, title, summary, and date. In block 350, all result patterns are evaluated according to predefined rating criteria. The predefined rating criteria may be the ability to normalize text fields as a date, character length of text fields, position of text fields in relation to other text fields, and location and proximity of HTML anchors in relation to text fields. The predefined rating criteria are specific to the fields of interest. Thus, the result patterns are examined and rated. The highest rated result pattern is most likely to contain the fields of interest (e.g. URL, title, summary and date).

Potential fields of interest in the result patterns are found by going over each of its integer number matches and looking for free text elements whose value changes across matches. This is because, in the simplification step, the free text elements are presented as uniform values, and if there is a pattern that repeats the integer number of times and the pattern differs along the matches, it is likely to be one of the searched result fields. Then, looking at each field, it is checked, for example, if any of them can be parsed as a date. If multiple dates are found, it chooses the best one determined by how many of the matches have a parseable date and how complete the date is. Next step may be to choose the longest field in terms of average number of characters over each match and set that as the summary. It may go on to look for fields occurring before the summary and choose the longest one before the summary as the title or if no fields occur before the summary it chooses one following the summary as the title. Finally it may examine each anchor to see if any of them immediately precedes the title. In HTML, an anchor can be either the origin or the target (destination) end of a hyperlink (e.g., <a href="url">Link text</a>). If so, then that field becomes the URL, otherwise it chooses the first anchor in the matches as the URL. Turning back to FIG. 3, the last step of the algorithm is presented in block 360, where a regular expression is generated from the highest rated result pattern. The regular expression created from the highest rated pattern may be used later to extract real results from raw HTML pages from a web search engine. The created regular expression matches all the result on the HTML page, capturing each result and its individual fields. The regular expression is constructed so as to match to certain fields of the HTML page and is able to extract these fields by having capturing groups where the fields are. In some embodiments, the generation of a regular expression from the highest rated result pattern includes restoration of any removed HTML tags during the simplification step. Then, all text fields are examined for HTML tags and tags found within the text fields are set to be allowable. Allowable tags mean that if such tags show up in the free text, the regular expression will still be able to extract properly the result fields, but such tags are not required to be present. Any other tags in the pattern that are not in the text fields are required to be matched. The regular expression is constructed so that when a tag is matched, only the angle brackets and tag name need to be matched. Also, all whitespace is ignored. An example of a generated regular expression from HTML follows:

```
HTML fragment:
</li><li class="summary">
<h3>
<a href="http://www.nytimes.com/
2009/03/09/business/economy/09treasury.html?scp=21&sq=
geithner&st=cse">
Geithner, With Few Aides, Faces a Wave of
Challenges<strong></strong>
</a></h3>
Even as Timothy F. Geithner
maintains a frenetic pace to help heal the economy, there are signs
that events are getting ahead of him.<strong></strong>
<span class="byline">
March 9, 2009 - By EDMUND L. ANDREWS and
STEPHEN LABATON - Business / Economy
</span>
```

-continued

```
Generated regular expression from the HTML fragment:
(?s)</li[\s\p{Cntrl}]*>[\s\p{Cntrl}]*<li\b[^>]*>[\s\p{Cntrl}]*
<h3\b[^>]*>[\s\p{Cntrl}]*
(?:(?:(?=(?:[\s\p{Cntrl}])*+<a\b[^>]*>)
(?:<(?:a\b[^>]*?\bhref\b[\s\p{Cntrl}]*=[\s\p{Cntrl}]*
([^>\s\p{Cntrl}]*)[^>]*)\b[^>]*>|[\s\p{Cntrl}])*+))
(?:((?=(?:</?(?:strong)\b[^>]*>|[\s\p{Cntrl}])*+[^<>\s\p{Cntrl}])
(?:</?(?:strong)\b[^>]*>|[^<>])*+))
</a[\s\p{Cntrl}]*>[\s\p{Cntrl}]*</h3[\s\p{Cntrl}]*>[\s\p{Cntrl}]*
(?:((?=(?:</?(?:strong)\b[^>]*>|[\s\p {Cntrl}])*+[^<>\s\p{Cntrl}])
(?:</?(?:strong)\b[^>]*>|[^<>])*+))
<span\b[^>]*>[\s\p{Cntrl}]*
(?:((?=(?:[\s\p{Cntrl}])*+[^<>\s\p{Cntrl}])(?:[^<>])*+))
</span[\s\p{Cntrl}]*>[\s\p{Cntrl}]*
```

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable medium as instructions. The term "computer readable medium" should be taken to include a single medium or multiple media that stores one or more sets of instructions. The term "computer readable medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 4:
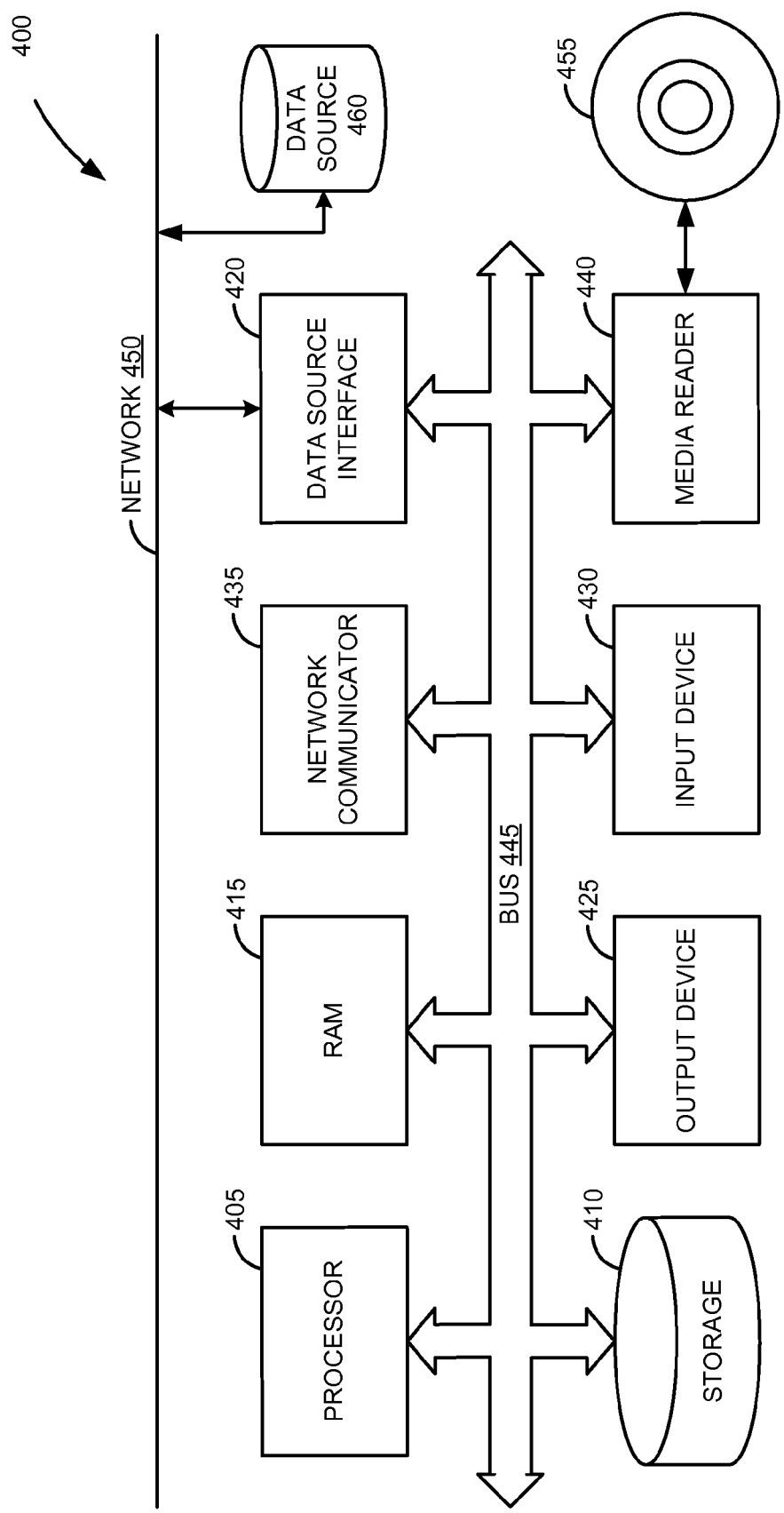
FIG. 4 is a block diagram of an embodiment of the invention for a computer system for pattern recognition in web search engine result pages.

FIG. 4 is a block diagram of an exemplary computer system 400. The computer system 400 includes a processor 405 that executes software instructions or code stored on a computer readable medium 455 to perform the above-illustrated methods of the invention. The computer system 400 includes a media reader 440 to read the instructions from the computer readable medium 455 and store the instructions in storage 410 or in random access memory (RAM) 415. The storage 410 provides a large space for keeping static data where at least some instructions could be stored for later execution. The stored instructions may be further compiled to generate other representations of the instructions and dynamically stored in the RAM 415. The processor 405 reads instructions from the RAM 415 and performs actions as instructed. According to one embodiment of the invention, the computer system 400 further includes an output device 425 (e.g., a display) to provide at least some of the results of the execution as output including, but not limited to, visual information to users and an input device 430 to provide a user or another device with means for entering data and/or otherwise interact with the computer system 400. Each of these output 425 and input devices 430 could be joined by one or more additional peripherals to further expand the capabilities of the computer system 400. A network communicator 435 may be provided to connect the computer system 400 to a network 450 and in turn to other devices connected to the network 450 including other clients, servers, data stores, and interfaces, for instance. The modules of the computer system 400 are interconnected via a bus 445. Computer system 400 includes a data source interface 420 to access data source 460. The data source 460 can be access via one or more abstraction layers implemented in hardware or software. For example, the data source 460 may be access by network 450. In some embodiments the data source 460 may be accessed via an abstraction layer, such as, a semantic layer. A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A non-transitory computer readable medium comprising computer readable instructions, which, when executed by a computer, cause the computer to perform a method, the method comprising:
   receiving a result page from a web search engine, the result page comprising text fields and markup tags, and an integer number for the results on the result page;
   generating simplified variations of the result page, the generating comprising:
      determining noisy markup tags in the result page;
      generating a first variation of the result page by removing the noisy markup tags from the result page;
      generating a plurality of other variations of the result page by preserving one noisy markup tag from the noisy markup tags and removing the rest of the noisy markup tags;
      stripping inside of remaining markup tags in the first variation and the plurality of other variations; and
      simplifying the text fields by marking the text fields with free text markers;
   parsing the simplified variations of the result page to determine one or more repeating patterns, the one or more repeating patterns comprising a substring of the simplified variations of the result page, the substring beginning at a start of a remaining markup tag or a free text marker and ending at a close of the remaining markup tag or the free text marker;
   selecting the one or more repeating patterns that are repeated the integer number of times in the result page as result patterns;
   selecting one of the one or more result patterns as a highest rated result pattern according to predefined rating criteria; and
   generating a regular expression from the highest rated result pattern as an output that matches the results on the result page.

2. The medium of claim 1, wherein the result page is an HTML page.

3. The medium of claim 2, wherein the predefined rating criteria include one or more criteria selected from the group consisting of ability to normalize text fields as a date, character length of text fields, position of text fields in relation to other text fields, and location and proximity of HTML anchors in relation to text fields.

4. The medium of claim 1, wherein the method further comprises saving the removed noisy markup tags and their location in the result page in order to be restored.

5. The medium of claim 1, wherein generating the regular expression from the highest rated result pattern comprises:
   restoring the removed noisy markup tags during the simplification step;
   examining the text fields for markup tags, including the restored noisy markup tags;
   setting the found tags in the text fields as allowable; and
   setting tags in the pattern that are not in the text fields as required to be matched.

6. A computer implemented method for pattern recognition in web search engine result pages, comprising:
   receiving an HTML result page from a web search engine, the HTML result page comprising text fields and markup tags, and an integer value with a number of results on the HTML result page;
   generating simplified variations of the HTML result page, the generating comprising:
      determining noisy markup tags in the result page;

generating a first variation of the result page by removing the noisy markup tags from the result page;

generating a plurality of other variations of the result page by preserving one noisy markup tag from the noisy markup tags and removing the rest of the noisy markup tags;

stripping inside of remaining markup tags in the first variation and the plurality of other variations; and simplifying the text fields by marking the text fields with free text markers;

parsing the simplified variations of the HTML result pages to determine one or more repeating patterns, the one or more repeating patterns comprising a substring of the simplified variations of the HTML result page, the substring beginning at a start of a remaining markup tag or a free text marker and ending at a close of the remaining markup tag or the free text marker;

selecting the one or more repeating patterns that are repeated the integer value number of times in the HTML result page as result patterns;

selecting one of the one or more result patterns as a highest rated result pattern according to predefined rating criteria; and generating a regular expression from the highest rated result pattern as an output that matches the results on the HTML result page.

7. The method of claim 6, wherein the noisy markup tags include one or more tags selected from the group consisting of bold tags, break tags, cite tags, emphasis tags, font tags, image tags, italic tags, no break tags, span tags, strong tags, and underline tags.

8. The method of claim 6, wherein the method further comprises saving the removed noisy markup tags and their location in the HTML result page in order to be restored.

9. The method of claim 6, wherein the predefined rating criteria include one or more selected from the group consisting of ability to normalize text fields as a date, character length of text fields, position of text fields in relation to other text fields, and location and proximity of HTML anchors in relation to text fields.

10. The method of claim 6, wherein generating the regular expression from the highest rated result pattern comprises:
   restoring the removed noisy markup tags during the simplification step;
   examining the text fields for markup tags, including the restored noisy markup tags;
   setting the found tags in the text fields as allowable; and
   setting tags in the pattern that are not in the text fields as required to be matched.

11. The method of claim 6, further comprising using the regular expression to extract fields from HTML result pages from the web search engine.

* * * * *